(12) United States Patent
Adams et al.

(10) Patent No.: US 11,153,342 B2
(45) Date of Patent: *Oct. 19, 2021

(54) METHOD AND SYSTEM FOR PROVIDING DDOS PROTECTION BY DETECTING CHANGES IN A PREFERRED SET OF HIERARCHICALLY STRUCTURED ITEMS IN STREAM DATA

(71) Applicant: Arbor Networks, Inc., Westford, MA (US)

(72) Inventors: Andrew Lee Adams, Burlington, MA (US); Cameron Hanover, Burlington, MA (US); Dagan Harrington, Burlington, MA (US); Jiasi Li, Burlington, MA (US); Joachim Wright, Burlington, MA (US)

(73) Assignee: Arbor Networks, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,149

(22) Filed: Sep. 9, 2019

(65) Prior Publication Data

US 2020/0259860 A1 Aug. 13, 2020

Related U.S. Application Data

(60) Provisional application No. 62/803,129, filed on Feb. 8, 2019.

(51) Int. Cl.
*H04L 29/06* (2006.01)

(52) U.S. Cl.
CPC ...... *H04L 63/1458* (2013.01); *H04L 63/1416* (2013.01); *H04L 63/1425* (2013.01); *H04L 63/1466* (2013.01)

(58) Field of Classification Search
None
See application file for complete search history.

(56) References Cited

U.S. PATENT DOCUMENTS

| | | | |
|---|---|---|---|
| 2002/0083175 A1* | 6/2002 | Afek | H04L 63/1458 709/225 |
| 2005/0111367 A1* | 5/2005 | Jonathan Chao | H04L 63/1458 370/235 |

(Continued)

OTHER PUBLICATIONS

Josh Karlin, Stephanie Forest, Jennifer Rexfor; Pretty Good BGP: Improving BGP by Cautiously Adopting Routes; IEEE, pp. 290-299 (Year: 2006).*

(Continued)

*Primary Examiner* — Arezoo Sherkat
(74) *Attorney, Agent, or Firm* — Locke Lord LLP; Scott D. Wofsy; Christopher J. Capelli

(57) ABSTRACT

A computer implemented method and system for protecting against denial of service attacks by detecting changes in a preferred set of hierarchically-structured items in a network data stream in which a set of network destination prefixes is identified that account for a user specified target of the attack traffic. Changes in the attack traffic profile are detected and new sets of network destination prefixes are generated when the attack has shifted by a predetermined threshold. sets of identified destination prefixes are then translated into route announcements to divert attack traffic to mitigation devices.

2 Claims, 4 Drawing Sheets

(56) References Cited

U.S. PATENT DOCUMENTS

| | | | |
|---|---|---|---|
| 2010/0132037 A1* | 5/2010 | Ji | G06F 21/554 726/22 |
| 2017/0250953 A1* | 8/2017 | Jain | H04L 63/0218 |
| 2018/0278500 A1* | 9/2018 | Feamster | H04L 63/1425 |
| 2020/0021613 A1* | 1/2020 | Tong | H04L 45/04 |

OTHER PUBLICATIONS

Ravi Vaidyanathan, Abhrajit Ghosh, Yuu-Heng Cheng, Akira Yamada, Yutaka Miyake; On the use of BGP AS numbers to detect spoofing; IEEE Globecom 2010 Workshop on Web and Pervasive security; pp. 1606-1610 (Year: 2010).*

Lavanya Jose, Minlan Yu, Jennifer Rexford, "Online measurement of large traffic aggregates on commodity switches", Mar. 29, 2011, 1st USENIX workshop on hot topics in management of Internet, cloud and enterprise networks and services, Hot-ICE 2011 (Year: 2011).*

* cited by examiner

METHOD AND SYSTEM FOR PROVIDING DDOS PROTECTION BY DETECTING CHANGES IN A PREFERRED SET OF HIERARCHICALLY STRUCTURED ITEMS IN STREAM DATA

FIELD OF THE INVENTION

The present invention relates generally to computer networks, and specifically to methods and systems for protecting against denial of service attacks by detecting changes in a preferred set of hierarchically-structured items in a network data stream.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks, and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks). Further, it is to be understood DDoS attacks are typically categorized as: TCP Stack Flood Attacks (e.g., flood a certain aspect of a TCP connection process to keep the host from being able to respond to legitimate connections (which may also be spoofed)); Generic Flood Attacks (e.g., consists of a flood of traffic for one or more protocols or ports, which may be designed to appear like normal traffic which may also be spoofed)); Fragmentation Attacks (e.g., consists of a flood of TCP or UDP fragments sent to a victim to overwhelm the victim's ability to re-assemble data streams, thus severely reducing performance); Application Attacks (e.g., attacks designed to overwhelm components of specific applications); Connection Attacks (e.g., attacks that maintain a large number of either ½ open TCP connections or fully open idle connections); and Vulnerability Exploit Attacks (e.g., attacks designed to exploit a vulnerability in a victim's operating system).

With regards to a DDoS attack commonly referred to as a "carpet bombing attack", it is noted standard industry methods for mitigating a carpet bombing attack often present a user with the risk of allowing more traffic to be diverted than can be accommodated by mitigation devices. The architecture of the Internet makes networks and network devices vulnerable to the growing problems of DDoS attacks. Therefore, the ability to avoid or mitigate the damages of a DDoS attack is advantageous to devices located in a protected network.

SUMMARY OF THE INVENTION

The purpose and advantages of the invention will be set forth in and apparent from the description that follows. Additional advantages of the invention will be realized and attained by the devices, systems and methods particularly pointed out in the written description and claims hereof, as well as from the appended drawings.

To achieve these and other advantages and in accordance with the purpose of the invention, as embodied, the invention includes, a system, method which enables a user to specify a target for the volume of attack traffic to be diverted, thus the system minimizes the chances of overwhelming mitigation devices.

An embodiment of the present invention relates to a system for identifying a set of network destination prefixes that accounts for a user-specified target of the attack traffic regarding a set of networks that are being monitored and which have been determined to be suffering a DDoS carpet bombing attack. The present invention tracks changes in the attack traffic profile to generate new sets when the attack has shifted significantly. It is to be appreciated the sets of destination prefixes identified by the system can be translated into BGP route announcements, to divert 'dirty' traffic to mitigation devices to be scrubbed.

A noted advantage and improvement provided by the present invention includes providing network administrators with a more effective process regarding the identification of routes to send to a router to divert attack traffic, and to adapt to changes in the attack so as detect when a new set of routes should be announced.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
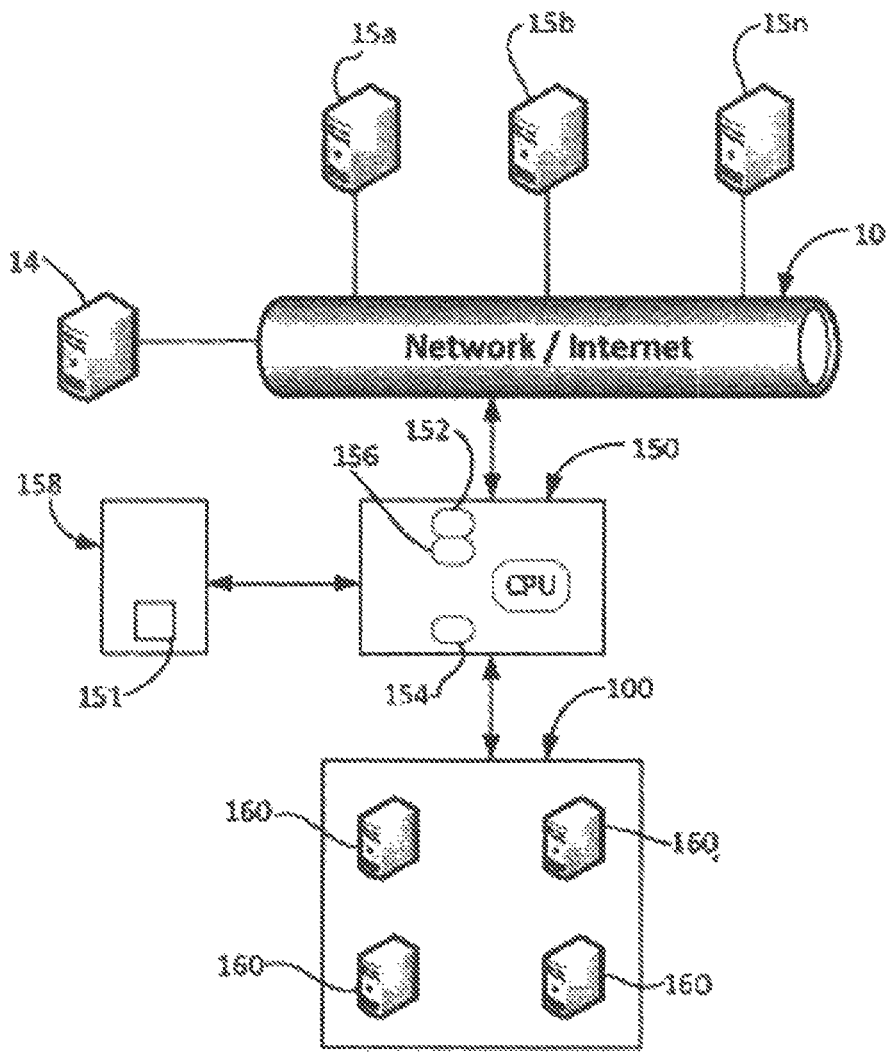
FIG. 1 illustrates an exemplary network communications system, in which an embodiment of the present invention may be implemented.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

It is to be further understood the illustrated embodiments of the present invention describe a system, apparatus and method for avoiding and mitigating the harmful effects of a Distributed Denial of Service ("DDoS") attack on a computer system/device or network. An ordinary denial of service attack, or DoS attack, may be defined as an attack by an offensive external device on a network device such as network routers, Internet servers, electronic mail servers, Domain Name System servers, etc. Such an attack may cause a loss of service to the network users due to a consumption of network bandwidth or an overload of system resources. The DDoS attack is an enhanced DoS attack in which multiple offensive devices coordinate a simultaneous attack upon a single targeted network device.

It is to be appreciated that an illustrated use of the illustrated system and process described herein is with the PRAVAIL™ Availability Protection System (PRAVAIL™ APS) from Arbor® Networks. PRAVAIL™ APS is a network security product configured and adapted for generally preventing DDoS attacks and availability threats that affect data centers and enterprise networks. PRAVAIL™ APS may be deployed by network/data center operators in front of services to stop application-layer attacks and disrupt botnet communications. PRAVAIL™ APS may further be integrated upstream in a network/date center to preferably stop thwart volumetric DDoS attacks. Features of PRAVAIL™ APS include (but are not limited to): detecting and blocking emerging application-layer DDoS attacks; deploy a turnkey solution to thwart DDoS threats; accelerate responses to DDoS attacks to prevent disruption of legitimate services; and prevent illegitimate botnet communications by leveraging real-time security intelligence, as to be described herein for instance.

Turning now descriptively to the drawings, in which similar reference characters denote similar elements throughout the several views, FIG. 1 illustrates the relationship between the protected network 100, protection system 150, Internet 10, and external host devices 15a, 15b . . . 15n. It is to be appreciated that protected network 100 preferably includes a plurality of servers 160 preferably consisting of a plurality of server types, including, but not limited to: Generic; Web; DNS; Mail; VOiP; VPN; RLogin; and File Servers.

In a typical implementation, the external host devices 15a, 15b . . . 15n (also referred to as external devices or host devices) attempt to connect to protected devices 160 within a protected network 100 typically via a private network or a public computer network such as the Internet 10. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by a protection system 150 preferably located between the Internet 10 and the protected network 100. Usually, the protected network 100 is an enterprise network, such as a school network, business network, and government network, to list a few examples.

In other embodiments, the protection system 150 is located within the Internet, service provider network or enterprise network rather than as a network edge as illustrated. It is to be appreciated that when deployed within the protected network, traffic is diverted to the protection system 150.

The protection system 150 preferably includes a packet processing system preferably having an external high speed network interface 152 and a protected high-speed network interface 154. Typically, these interfaces are capable of handling 1.5-40 Gbps, for example. System 150 may further include processors 156 that preferably process the packets received at interfaces 152 and 154. Additionally, a central processing unit (CPU), random access memory (RAM), and a storage medium 158 are preferably connected through buses and are used to further support the processing of the received packets. Computer code is preferably stored in the storage medium and executed by the CPU. In one illustrated embodiment, the storage medium 158 may preferably include content-addressable memory (CAM), which is memory designed for use in very high speed searching applications. It is noted CAM memory operates different from the more commonly used random access memory (RAM). With RAM memory a memory address is specified and the data stored at that address is returned. With CAM memory, the entire memory is searched to see if specified data are stored anywhere in the memory. The storage medium 158 also preferably stores the host tables 151 used in the below described authenticated process of external device hosts 15a, 15b . . . 15n as well as other possible information such as predefined filter rules.

In a typical implementation, the protection system 150 authenticates all external host devices 15a, 15b . . . 15n before allowing the external devices to access the protected devices 160 within the protected network 100.

During an attack, a conventional protection system 150 seeks to distinguish between attack traffic 14 and traffic made by legitimate host devices 15a, 15b . . . 15n by analyzing traffic to determine traffic (packet) classifications which are subsequently used to determine countermeasures (preferably of varying severity to mitigate attack), which are to be applied to received packets in the traffic, prior to accessing the protected devices 160 within the protected network 100. Thus, a goal of the protection system 150 is to selectively apply/modify one or more countermeasures to a determined traffic class/category to prevent traffic 14 from malicious devices from accessing the protected network 100.

Figure 2:
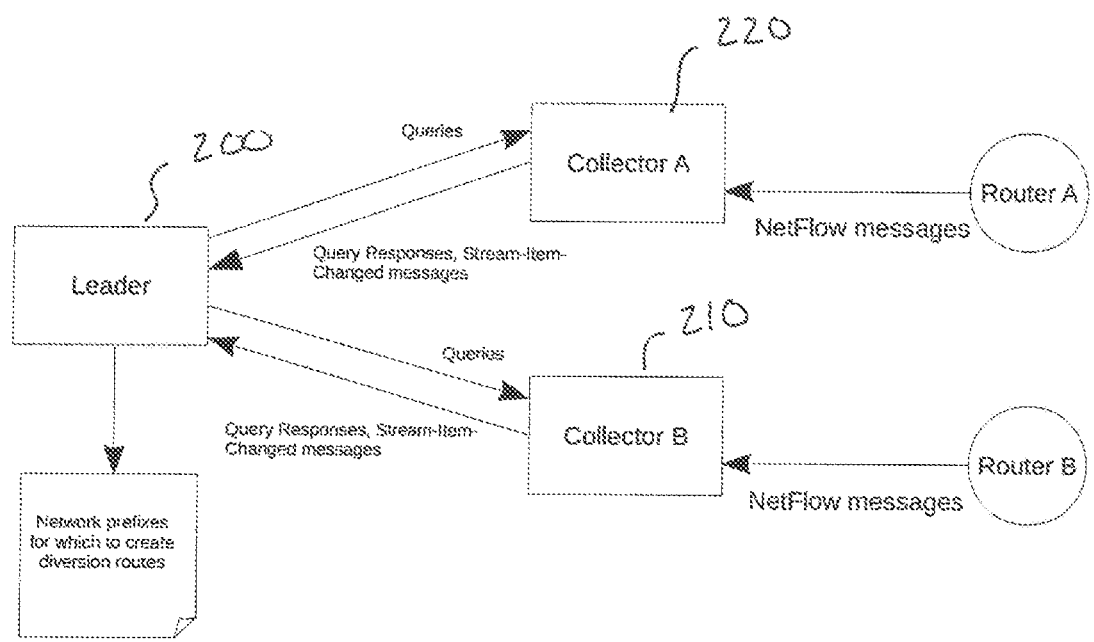
FIG. 2 is a system level diagram depicting an illustrated embodiment.
Figure 3:
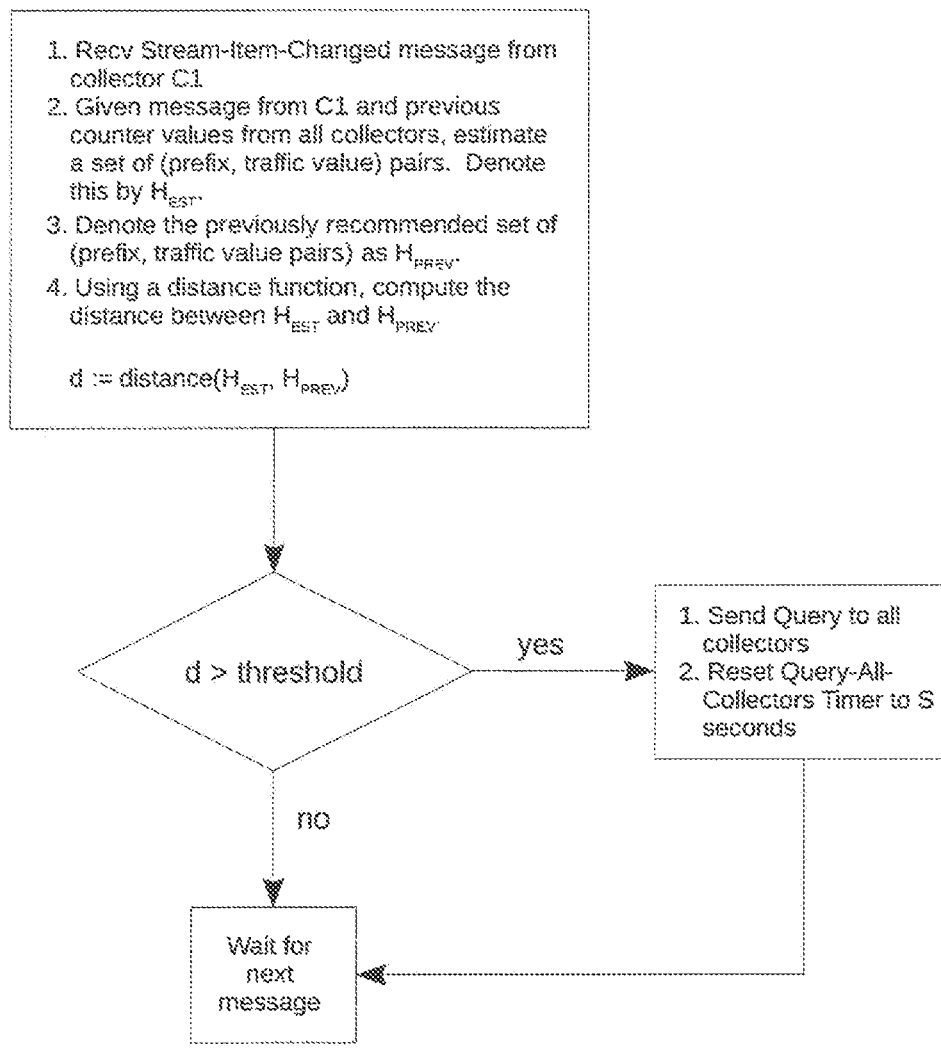
FIGS. 3 and 4 are flow charts depicting operation of the system depicted in FIG. 2 in accordance with an illustrated embodiment.
Figure 4:
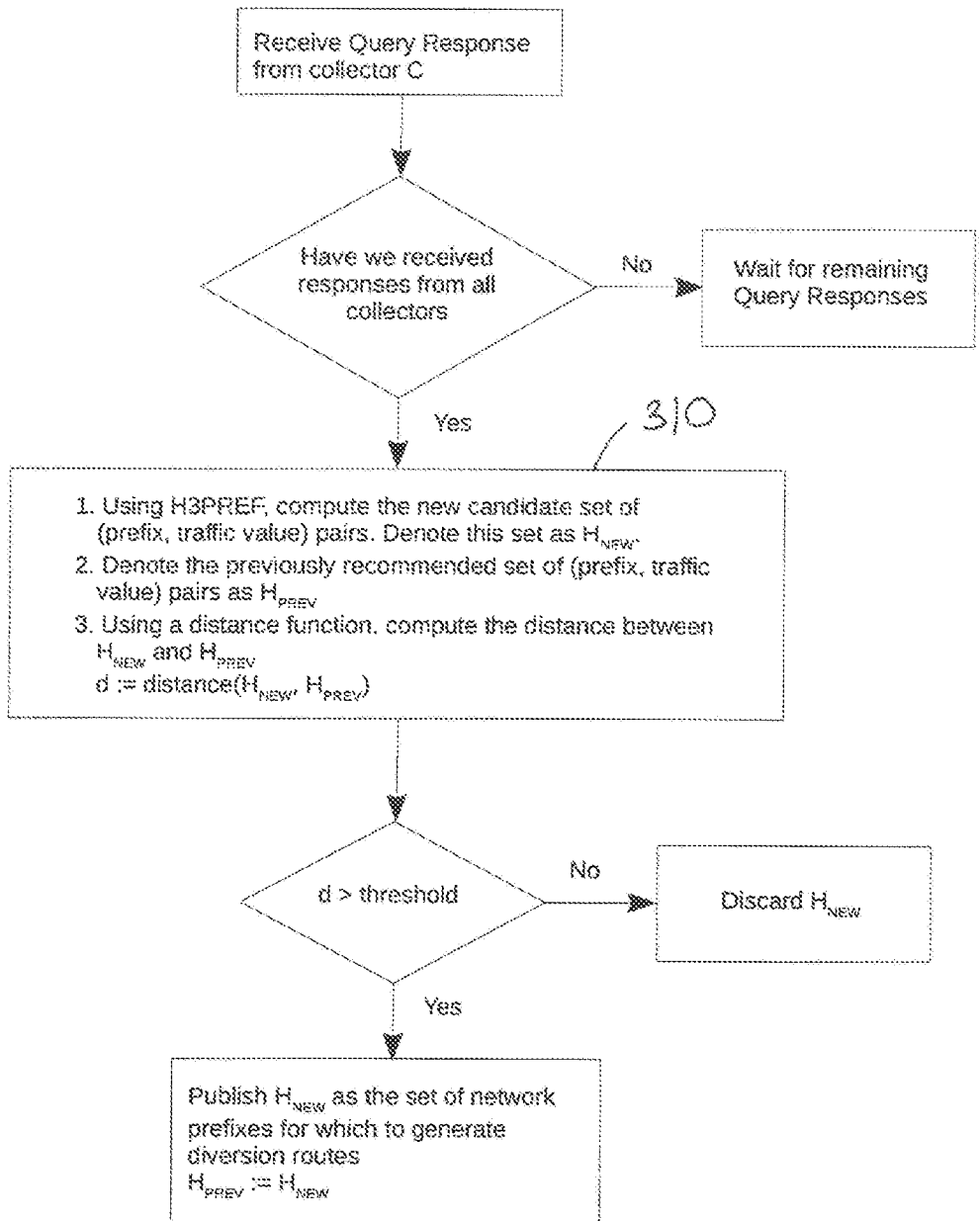

With regards to an embodiment of the present invention, and with reference now to FIGS. 2-4, it is to be appreciated that "Nodes" are utilized in association with the network 10, which are also referred to as collectors, which preferably process Netflow packets generated by monitored routers. The collectors read destination host addresses and byte counts from these Netflow packets so as to maintain limited set of counters to track traffic to host addresses, as well as to track traffic to a configured set of less specific network prefixes that contain those host addresses. It is to be appreciated that counters are maintained preferably using an H3PREF algorithm as described in related and co-pending U.S. patent application Ser. No. 16/564,740 the contents of which are hereby incorporated by reference.

When a DDoS attack is detected, a special node in the network (e.g., the Leader node 200) queries all collectors for the values of their counters, as well as the IP prefixes tracked by those counters. From the set of aggregated counter values, the Leader preferably utilizes the H3PREF algorithm to compute a set of prefixes (either host or subnet) that is seen to be the sink for no more than some pre-configured maximum of traffic. This effectively identifies a minimal set of prefixes that is utilized to create diversion routes to be announced to the routers. The diverted traffic may then be dropped or scrubbed as desired by network operators.

A noted challenge is detecting if and when the attack traffic shifts such that if a new set of prefixes were to be identified, it would differ significantly from the original set. Thus, an object of the present invention is to meet this challenge by providing an improvement to existing computer detection technology such that counters at collectors preferably track byte counts for prefixes over a sliding window that maintains counter history for a certain amount of time. This window is divided into equal length blocks. For example, the window length could be defined to be 60 seconds, and a block defined to be 15 seconds. A dedicated clock is set to tick every block-length seconds.

In accordance with an illustrated embodiment of the present invention, preferably associated with every counter is a ring buffer consisting of a sliding-window's worth of blocks. Each counter preferably has a ring buffer consisting of four elements. An index into the ring buffer is maintained that indicates the position of the current element. On every clock tick, the index advances. As Netflow packets are processed, the byte count for a given prefix is accumulated in the current element. After a window's worth of clock ticks, the oldest value in the buffer is forgotten, as it is zeroed out before being used to accumulate byte counts during the current block. When the value is forgotten, that value is preferably subtracted from the counter.

On collectors (210, 220), every time a timer is updated, a weighted sum of bytes collected over the sliding window is computed. If the value deviates by more than a prescribed threshold from the value previously reported to the Leader, the collector then queues the details of the deviation for reporting to the Leader. During a prescribed time period (e.g., every few seconds), the accumulated deviations are batched into a "Stream Item Changed message", which is preferably sent to the Leader.

Upon reception of the Stream Item Changed message, the Leader preferably processes a Stream Item Changed message so as to determine, preferably by estimation (step 310), what a new set of prefixes would look like given the changes reported for the prefixes in the message. Preferably, estimations are made regarding how that change might be present on other collectors, as well as how the change should be scaled based on the fraction of total byte volume the reporting collector is experiencing. A specially-crafted distance function is then applied to the estimated prefix set and preferably the most recently reported prefix set. If that distance exceeds a defined threshold, then it is determined (e.g., suspected) that the prefix set should be recomputed using fresh data.

Next, the Leader preferably again queries collectors for their counter state. Responses from at least a pre-defined fraction of the total number of collectors are received in order for a new set to be computed. If a sufficient amount of responses are received (which should be the normal scenario) then a new set is computed. The specially-crafted distance function is then applied to the new prefix set and the most recently reported (not the estimated) prefix set. If this difference exceeds a pre-defined threshold, then the system reports the new set of prefixes so that routes can be generated for them.

It is to be appreciated that there may be changes in the attack profile that evade detection by the above method. In order to address this scenario, if collectors have not been queried in a predetermined time period (e.g, last X seconds), the Leader then sends a query to all collectors, computes a new prefix set based on the responses, and computes its distance from the last computed set as previously described. If the distance is seen to exceed a pre-defined threshold, then the new set is reported.

Accordingly, advantages provided by the present invention and improvements to existing computer technology relating to threat detection include (but are not limited to): 1) pairing a Hierarchical Heavy Hitter algorithm with a sliding window per counter; 2) modifying a Space Saving algorithm by allowing counters to decrement as volume 'ages out'; and 3) generating an alert during the update operation if a change during the current block is seen as significant and constructing a function that computes a distance between two sets of network prefixes.

With the illustrative embodiments of the invention described above, it is to be appreciated the above presents a description of a best mode contemplated for carrying out the present invention and of the manner and process of making and using it in such full, clear, concise, and exact terms as to enable any person skilled in the art to which it pertains to make and use these devices and methods. The present invention is, however, susceptible to modifications and alternative method steps from those discussed above that are fully equivalent. Consequently, the present invention is not limited to the particular embodiments disclosed. On the contrary, the present invention encompasses all modifications and alternative constructions and methods coming within the spirit and scope of the present invention. The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims.

What is claimed is:

1. A method for protecting against denial of service (DoS) attacks by detecting changes in a preferred set of hierarchically-structured items in a network data stream, comprising:

capturing network traffic from a network data stream from a plurality of network routers coupled to the network data stream;

collecting the captured network traffic in a plurality of network traffic collectors wherein each of the network traffic collectors is respectively coupled to a respective network router in the plurality of network routers and wherein each of the network traffic collectors includes a network traffic counter, reads destination host addresses and bytes counts present in the captured network traffic, maintains a limited set of network traffic counters for tracking network traffic to host addresses, tracks network traffic to a configured set of network prefixes containing the host addresses, wherein each of the network traffic counters in the limited set of the network traffic counters is maintained using a Hierarchically Heavy Hitters (H3PREF) algorithm and whereby each of the network traffic collectors is further coupled to a common leader nodal device;

querying, upon detection of a DoS attack, by the common leader nodal device, each of the coupled network traffic collectors to obtain network counter values and Internet Protocol (IP) prefixes tracked by each of the coupled network traffic collectors;

identifying, by the common leader nodal device, a set of network destination prefixes that account for a user specified target of the DoS attack utilizing the obtained network counter values and IP prefixes;

tracking, by the common leader nodal device, changes in the attack traffic profile present in the DoS attack;

generating, by the common leader nodal device, new sets of network destination prefixes when the DoS attack has shifted by a predetermined threshold; and translating, by the common leader nodal device, sets of identified destination prefixes into route announcements via the generated new sets of network destination prefixes to divert attack traffic of the DoS attack to mitigation devices.

2. A system for protecting against denial of service (DoS) attacks by detecting changes in a preferred set of hierarchically-structured items in a network data stream, comprising:

a plurality of network routers coupled to the network data stream configured to capture network traffic from a network data stream;

a plurality of network traffic collectors, respectively coupled to a respective network router such that each of the network traffic collectors collects the captured network traffic from a respective coupled network router wherein each of the network traffic collectors includes a network traffic counter, reads destination host addresses and bytes counts present in the captured network traffic, maintains a limited set of network traffic counters for tracking network traffic to host addresses, tracks network traffic to a configured set of network prefixes containing the host addresses, wherein each of the network traffic counters in the limited set of the network traffic counters is maintained using a Hierarchically Heavy Hitters (H3PREF) algorithm;

a common leader nodal device coupled to each of the plurality of the network traffic collectors, the common leader nodal device configured to:

query, upon detection of a DoS attack, the network traffic counter of each of the coupled network traffic collectors to obtain network counter values and Internet Protocol (IP) prefixes tracked by each of the coupled network traffic collectors;

identify a set of network destination prefixes that accounts for a user specified target of the DoS attack utilizing the obtained network counter values and IP prefixes;

track changes in attack traffic profile present in the DoS attack;

generate new sets of network destination prefixes when the DoS attack has shifted by a predetermined threshold; and translate sets of identified destination prefixes into route announcements via the generated new sets of network destination prefixes to divert attack traffic of the DoS attack to mitigation devices.

* * * * *